(12) United States Patent
Hamilton et al.

(10) Patent No.: US 10,865,292 B1
(45) Date of Patent: Dec. 15, 2020

(54) PNEUMATIC TIRE WITH IMPROVED BEAD FILLER

(71) Applicant: BRIDGESTONE AMERICAS TIRE OPERATIONS, LLC, Nashville, TN (US)

(72) Inventors: Paul N. Hamilton, New Franklin, OH (US); Amy M. Randall, Brentwood, TN (US); Terrence E. Hogan, Uniontown, OH (US); Benjamin C. Galizio, Kent, OH (US); Steven R. Reynolds, Akron, OH (US)

(73) Assignees: Bridgestone Americas Tire Operations, LLC, Nashville, TN (US); Firestone Polymers, LLC, Akron, OH (US)

( * ) Notice: Subject to any disclaimer, the term of this patent is extended or adjusted under 35 U.S.C. 154(b) by 8 days.

(21) Appl. No.: 15/689,793

(22) Filed: Aug. 29, 2017

Related U.S. Application Data

(60) Provisional application No. 62/380,823, filed on Aug. 29, 2016.

(51) Int. Cl.
| | |
|---|---|
| *C08L 9/06* | (2006.01) |
| *C08L 21/00* | (2006.01) |
| *C08K 3/04* | (2006.01) |
| *B60C 15/06* | (2006.01) |
| *C08J 3/24* | (2006.01) |
| *C08F 297/04* | (2006.01) |
| *B60C 1/00* | (2006.01) |

(52) U.S. Cl.
CPC ............ *C08L 9/06* (2013.01); *B60C 15/0603* (2013.01); *C08J 3/24* (2013.01); *C08K 3/04* (2013.01); *C08L 21/00* (2013.01); *B60C 2001/005* (2013.01); *C08F 297/04* (2013.01)

(58) Field of Classification Search
CPC .... C08L 9/06; C08L 21/00; C08J 3/24; B60C 15/0603; B60C 2001/005; C08K 3/04; C08F 297/04
See application file for complete search history.

(56) References Cited

U.S. PATENT DOCUMENTS

| | | | |
|---|---|---|---|
| 5,225,457 A | 7/1993 | Borowczak et al. | |
| 5,749,983 A * | 5/1998 | Yokoyama ............ | B60C 1/0016 152/209.1 |
| 5,879,482 A | 3/1999 | Rooney et al. | |
| 6,037,418 A * | 3/2000 | Mukai ...................... | C08J 3/005 523/351 |
| 6,530,404 B1 | 3/2003 | Rooney | |
| 6,541,551 B1 * | 4/2003 | Durairaj ................... | C08K 5/13 524/248 |
| 2005/0096424 A1 * | 5/2005 | Otsuji ....................... | C08L 9/00 524/496 |
| 2012/0101211 A1 * | 4/2012 | Fujiki ....................... | C08G 8/22 524/511 |
| 2012/0259082 A1 * | 10/2012 | Hogan ................. | C07D 307/12 526/183 |
| 2015/0225551 A1 * | 8/2015 | Yang ........................ | C08L 7/00 524/511 |

FOREIGN PATENT DOCUMENTS

| | | |
|---|---|---|
| EP | 0514910 | 11/1992 |
| JP | 2005194398 | 7/2005 |
| JP | 2008168800 | 7/2008 |

OTHER PUBLICATIONS

Ciesielski, A.; An Introduction to Rubber Technology, 1999, p. 84-87.*

* cited by examiner

*Primary Examiner* — Robert S Jones, Jr.
(74) *Attorney, Agent, or Firm* — Meredith E. Hooker; Arthur M. Reginelli

(57) ABSTRACT

A vulcanizable composition for preparing bead filler, the composition comprising a vulcanized rubber; and a vinyl aromatic-containing block copolymer compound, where the vinyl aromatic-containing copolymer is defined by the formula II $$d\text{-}V\text{o-}D\text{-}V'\text{-}\omega \qquad \text{II}$$

where each V is independently a polyvinyl aromatic block, D is a polydiene block, w is a hydrogen atom, a functional group, or a polymeric segment or block, and where d is a polydiene block, and where the overall vinyl content of the block copolymer is greater than 65%.

12 Claims, 1 Drawing Sheet

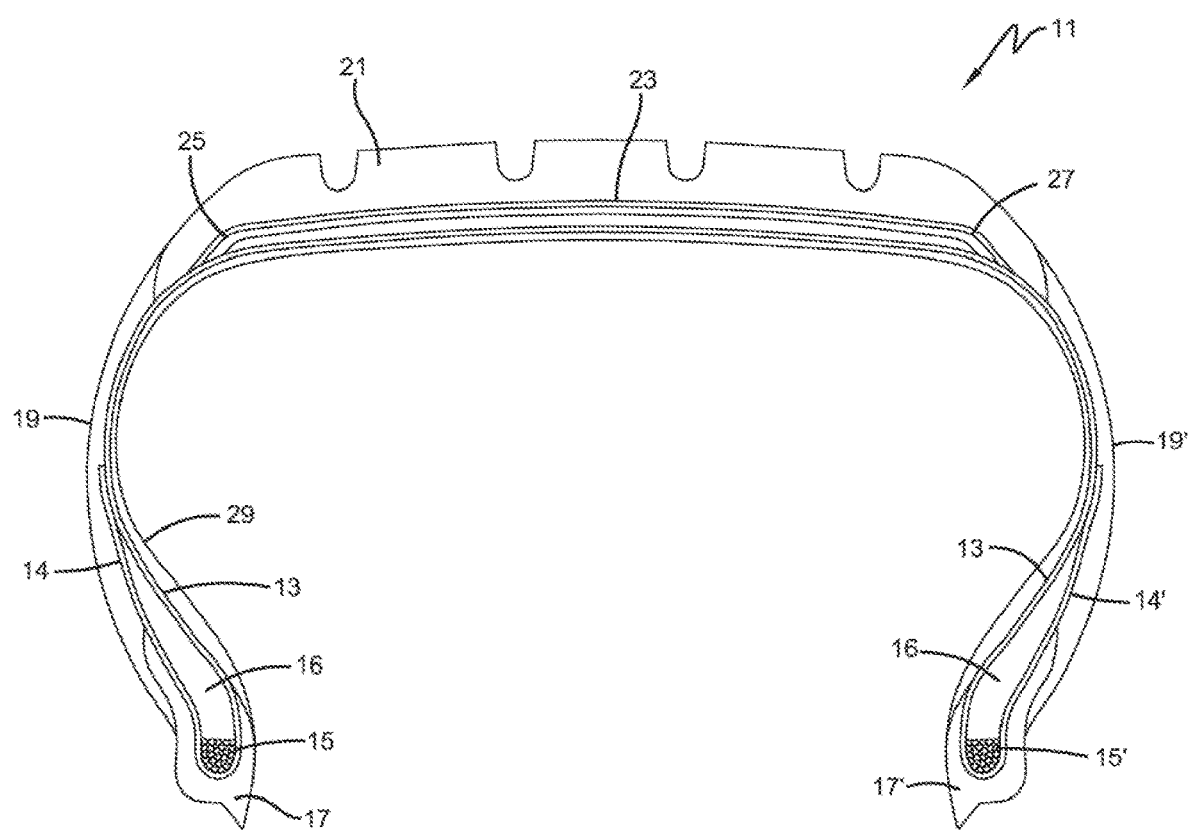

PNEUMATIC TIRE WITH IMPROVED BEAD FILLER

This application claims the benefit of U.S. Provisional Application Ser. No. 62/380,823 filed on Aug. 29, 2016, which is incorporated herein by reference.

FIELD OF THE INVENTION

Embodiments of the present invention are directed toward pneumatic tires having bead fillers that include vinyl aromatic-containing block copolymer.

BACKGROUND OF THE INVENTION

One common carcass structure for a pneumatic tire includes a ply of main body cords that extend between a pair of bead assemblies. The body cords may extend radially or at a bias between the bead assemblies. Each bead assembly typically includes a loop-shaped bead core fabricated from a plurality of relatively stiff metal wires. Each bead assembly also typically includes a bead filler, which may also be referred to as a bead apex, that is designed as a stiff rubber material. The bead filler is disposed radially above the bead core construction and fills the space between the main portion of the ply of body cords and the turn-up portion of the ply of body cords.

The bead assemblies generally perform the function of fixing the tire on a respective rim. The bead assemblies also anchor the carcass ply or plies and must withstand the forces exerted by the carcass under the affect of inflation pressure as well as deformations resulting from tire use. The bead assemblies also ensure the transmission of longitudinal forces. In other words, the bead assemblies absorb the tension of the carcass reinforcement and transmit the load to which the tire is subjected from the sidewall to the rim. The bead assemblies therefore influence road handling.

The skilled person therefore appreciates that there is a desire to prepare a bead filler with maximum stiffness. This desire, however, presents several challenges. First, compound stiffness can present manufacturing difficulties since the rubber composition must have a viscosity that is sufficiently low for rubber processing. Also, while higher stiffness can be achieved through higher filler loadings, highly filled compositions can deleteriously impact rolling resistance (i.e., provide more hysteretic loss).

There is therefore a need in the art to further improve bead filler compositions.

SUMMARY OF THE INVENTION

One or more embodiments of the present invention provide A vulcanizable composition for preparing bead filler, the composition comprising a vulcanized rubber; and a vinyl aromatic-containing block copolymer compound, where the vinyl aromatic-containing copolymer is defined by the formula II $$d\text{-}V\omega\text{-}D\text{-}V'\text{-}\omega \qquad \qquad II$$

where each V is independently a polyvinyl aromatic block, D is a polydiene block, w is a hydrogen atom, a functional group, or a polymeric segment or block, and where d is a polydiene block, and where the overall vinyl content of the block copolymer is greater than 65%.

Yet other embodiments of the present invention provide A tire comprising a bead filler including the vulcanized residue of a vulcanizable composition including a rubber and a vinyl aromatic-containing block copolymer compound, where the vinyl aromatic-containing copolymer is defined by the formula II $$d\text{-}V\omega\text{-}D\text{-}V'\text{-}\omega \qquad \qquad II$$

where each V is independently a polyvinyl aromatic block, D is a polydiene block, w is a hydrogen atom, a functional group, or a polymeric segment or block, and where d is a polydiene block, and where the overall vinyl content of the block copolymer is greater than 65%.

Still other embodiments of the present invention provide A method for preparing a tire, the method comprising of vulcanizing a green tire, where said green tire includes a green bead filler that is fabricated from a vulcanizable composition of matter comprising a rubber, a vinyl aromatic-containing block copolymer compound, and a curative, where the vinyl aromatic-containing copolymer is defined by the formula II $$d\text{-}V\omega\text{-}D\text{-}V'\text{-}\omega \qquad \qquad II$$

where each V is independently a polyvinyl aromatic block, D is a polydiene block, w is a hydrogen atom, a functional group, or a polymeric segment or block, and where d is a polydiene block, and where the overall vinyl content of the block copolymer is greater than 65%.

BRIEF DESCRIPTION OF THE DRAWING

The FIGURE is a cross-sectional view of a tire according to one or more embodiments of the invention.

DETAILED DESCRIPTION OF ILLUSTRATIVE EMBODIMENTS

Embodiments of the invention are based, at least in part, on the discovery of a pneumatic tire having bead fillers prepared from compositions that include a vinyl aromatic-containing block copolymer. The block copolymers advantageously contribute to a bead filler having relatively high dynamic stiffness while the vulcanizable compositions including the copolymers demonstrate reasonably low viscosity under rubber mixing conditions. As a result, the present invention provides pneumatic tires having bead fillers that demonstrate relatively high stiffness under operating conditions that are prepared from vulcanizable compositions that can be processed by conventional rubber mixing techniques.

Tire Structure

Aspects of the invention can be described with reference to the FIGURE, which shows tire 11 including carcass 13 extending between a pair of axially spaced beads 15, 15'. Carcass 13 includes opposed turn-up portions 14, 14', which thereby cause body ply 13 to surround bead filler portions 16, 16', which may also be referred to as bead apex 16, 16'. Abrasion strips 17, 17 partially encase body ply 13 at or near beads 15, 15'. Tire 11 further includes opposing sidewalls 19, 19', and tread portion 21, which forms the outermost circumferential surface of tire 11. A subtread 23 may be disposed below tread 21, an undertread 25 may be disposed below subtread 23, and a belt package 27 may be disposed below undertread 25. Belt package 27, which may include a plurality of belts (not shown) is positioned above carcass 13, which itself may include one or more body plies (not shown). An inner liner 29 can be disposed on the interior of carcass 13 relative to tread 21. As the skilled person will appreciate, tire 11 may also include various other components, which are not shown, such as, but not limited to, tread shoulders, cap plies, belt wedges, and belt shoulders. Likewise, without departing from the invention, one or more of the various tire elements, outside of the bead filler, can be eliminated based on tire design.

Bead Filler Composition

As indicated above, bead fillers of the present invention are prepared from vulcanizable compositions of matter, which may also be referred to as bead filler compounds, that include a vinyl aromatic-containing block copolymer. In one or more embodiments, vulcanizable compositions used to prepare the bead fillers otherwise include conventional ingredients. For example, in one or more embodiments, the bead filler compounds of the present invention may include an elastomer, a filler, a curative, and a reinforcing resin. Other optional ingredients may include cure activators, cure accelerators, oils, tackifier resins, adhesion promotors, plasticizers, pigments, fatty acids, zinc oxide, and peptizing agents. Bead filler formulations and the various ingredients that can be used are known in the art as described, for example, in U.S. Publ. Nos. 2010/0276054, 2013/0075010, 2014/0360647, and 2016/0167449, which are incorporated herein by reference.

Rubber

In one or more embodiments, the rubber, which may also be referred to as a vulcanizable rubber or elastomer, may include those polymers that can be vulcanized to form compositions possessing rubbery or elastomeric properties. These elastomers may include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms. In particular embodiments, the sidewall compounds of the present invention include a blend of natural rubber and synthetic diene rubber such as polybutadiene. In other embodiments, the sidewall compounds of the present invention include olefinic rubber such ethylene-propylene-diene rubber (EPDM).

Filler

The filler may include one or more conventional reinforcing or non-reinforcing fillers. For example, useful fillers include carbon black, silica, alumina, and silicates such as calcium, aluminum, and magnesium silicates.

In one or more embodiments, carbon blacks include furnace blacks, channel blacks, and lamp blacks. More specific examples of carbon blacks include super abrasion furnace (SAF) blacks, intermediate super abrasion furnace (ISAF) blacks, high abrasion furnace (HAF) blacks, fast extrusion furnace (FEF) blacks, fine furnace (FF) blacks, semi-reinforcing furnace (SRF) blacks, medium processing channel blacks, hard processing channel blacks, conducting channel blacks, and acetylene blacks. Representative carbon blacks useful in one or more embodiments may include those designated by ASTM D1765 as N326, N330, N339, N343, N347, N351, N358, N550, N650, N660, N762, N772, and N774.

In particular embodiments, the carbon blacks may have a surface area (EMSA) of at least 20 $m^2/g$, in other embodiments at least 35 $m^2/g$, in other embodiments at least 50 $m^2/g$, in other embodiments at least 60 $m^2/g$; surface area values can be determined by ASTM D-1765 using the cetyltrimethylammonium bromide (CTAS) technique. In particular embodiments, the sidewalls include carbon black filler having a surface area (EMSA) of from about 60 to about 110 $m^2/g$. The carbon blacks may be in a pelletized form or an unpelletized flocculent form. The preferred form of carbon black may depend upon the type of mixing equipment used to mix the rubber compound.

In one or more embodiments, the filler may include silica. When silica is used as a filler, the silica may be employed in conjunction with a coupling agent. In these or other embodiments, the silica may be used in conjunction with a silica dispersing agent.

In one or more embodiments, useful silicas include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. In particular embodiments, the silica is a precipitated amorphous wet-processed hydrated silica. In one or more embodiments, these silicas are produced by a chemical reaction in water, from which they are precipitated as ultra-fine, spherical particles. These primary particles are believed to strongly associate into aggregates, which in turn combine less strongly into agglomerates.

Some commercially available silicas that may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in J. Am. Chem. Soc., vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

In one or more embodiments, the pH of silica may be from about 5 to about 7 or slightly over 7, or in other embodiments from about 5.5 to about 6.8.

In one or more embodiments, useful silica coupling agents include sulfur-containing silica coupling agents. Examples of sulfur-containing silica coupling agents include bis(trialkoxysilylorgano)polysulfides or mercapto-organoalkoxysilanes. Types of bis(trialkoxysilylorgano)polysulfides include bis(trialkoxysilylorgano)disulfide and bis(trialkoxysilylorgano)tetrasulfides. Exemplary silica dispersing aids include, but are not limited to an alkyl alkoxysilane, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, and mixtures thereof, or a mineral or non-mineral additional filler.

Curative

A multitude of rubber curing agents (also called vulcanizing agents) may be employed, including sulfur-based or peroxide-based curing systems. Curing agents are described in Kirk-Othmer, ENCYCLOPEDIA OF CHEMICAL TECHNOLOGY, Vol. 20, pgs. 365-468, (3$^{rd}$ Ed. 1982), particularly *Vulcanization Agents and Auxiliary Materials*, pgs. 390-402, and A.Y. Coran, *Vulcanization*, ENCYCLOPEDIA OF POLYMER SCIENCE AND ENGINEERING, (2$^{nd}$ Ed. 1989), which are incorporated herein by reference. In one or more embodiments, the curative is sulfur. Examples of suitable sulfur-based vulcanizing agents include "rubberrmaker's" soluble sulfur; sulfur donating vulcanizing agents, such as an amine disulfide, polymeric polysulfide or sulfur olefin adducts; and insoluble polymeric sulfur. Vulcanizing agents may be used alone or in combination.

In one or more embodiments, the curative is employed in combination with a cure accelerator. In one or more embodiments, accelerators are used to control the time and/or temperature required for vulcanization and to improve properties of the vulcanizate. Examples of accelerators include thiazol vulcanization accelerators, such as 2-mercaptobenzothiazol, dibenzothiazyl disulfide, N-cyclohexyl-2-benzothiazyl-sulfenamide (CBS), and the like, and guanidine vulcanization accelerators, such as diphenylguanidine (DPG) and the like.

Antidegradants

In one or more embodiments, the antidegradants may include antioxidants, antiozonants, and waxes. In particular embodiments, the sidewall compounds of this invention include at least one of an antioxidant, an antiozonant, and a wax. In one or more embodiments, the sidewall compounds include an antioxidant, an antiozonant, and a wax.

In one or more embodiments, useful antioxidants include substituted phenols, diphenyl amine-acetone reaction products, 2,2,2-trimethyl-1,2-dihydroquinoline polymer (TMQ), and tri(nonophenyl)phosphite.

In one or more embodiments, useful antiozonants include amines such as N,N-disubstituted-p-phenylene diamines. These diamines may include both symmetrical and asymmetrical compounds. Useful symmetrical diamines include N,N-dialkyl-p-phenylene diamine. Useful asymmetrical diamines include N-alkyl, N'-aryl-p-phenylene diamines such as N-(1,3-dimethylbutyl)-N'-phenyl-p-phenylene diamine (6PPD) and N-isopropyl-N'-phenyl-p-phenylene diamine.

Reinforcing Resins

In one or more embodiments, the reinforcing resin may include a thermosetting resin. The thermosetting resin may be formed in-situ through, for example, the reaction between a donor compound and an acceptor compound. Exemplary donor compounds include, but are not limited to, hexamethoxymethylmelamine (HMMM), hexaethoxymethylmelamine, N-(substituted oxymethyl) melamine derivatives such as hexakis (methoxymethyl) melamine, N,N',N"-trimethyl-N,N',N"-trimethylolmelamine, hexamethyolmelamine, N,N',N"-trimethylolmelamine, N-methylolmelamine, N,N'-dimethylolmelamine, N,N',N"-triethyl-N,N',N"-tris (methoxymethyl) melamine, and N,N',N"-tributyl-N,N',N"-trimethylolmelamine, imino-methoxymethylmelamine, imino-isobutoxymethylmelamine, lauryloxymethylpyridinium chloride, ethoxymethylpyridinium chloride trioxan and hexamethoxymethylmelamine. Exemplary acceptor compounds include, but are not limited to, resorcinol, phenols, or substituted phenols such as p-isopropylphenol, p-cresol and 4-(p-methyl)phenol, N-(3-hydroxyphenyl) meleamic acid and N-(4-hydroxyphenyl) meleamic acid, phenolic cashew nut oil resin, resorcinol monobenzoate and polyhydric phenoxy resin. Other useful thermosetting resins include preformed resins such as phenol-aldehyde and resorcinol-aldehyde resins (e.g., phenol formaldehyde resins).

Styrene-Containing Block Copolymer

In one or more embodiments, the vinyl aromatic-containing block copolymer is a copolymer (which may be referred to simply as the block copolymer) including a block deriving from the polymerization of vinyl aromatic monomer and a block deriving from the polymerization of conjugated diene monomer. In one or more embodiments, the vinyl aromatic-containing block copolymers may be defined by the formula I

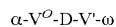

$$\alpha\text{-}V^O\text{-}D\text{-}V'\text{-}\omega$$

where each V is independently a polyvinyl aromatic block, D is a polydiene block, and α and ω are each independently a hydrogen atom, a functional group, or a polymeric segment or block. In particular embodiments, the block copolymer is styrene-containing block copolymer.

In one or more embodiments, D of formula I is characterized by a vinyl content (i.e., the percentage of mer units positioned in the 1,2-microstructure) of greater than 30%, in other embodiments greater than 40%, in other embodiments greater than 50%, in other embodiments greater than 55%, in other embodiments greater than 60%, in other embodiments greater than 65%, in other embodiments greater than 70%, in other embodiments greater than 75%, in other embodiments greater than 80%, and in other embodiments greater than 85%. In these or other embodiments, D is characterized by a vinyl content of less than 100%, in other embodiments less than 95%, in other embodiments less than 90%, in other embodiments less than 85%, and in other embodiments less than 80%. In one or more embodiments, D is characterized by a vinyl content of from about 30% to about 90%, in other embodiments from about 50% to about 85%, and in other embodiments from about 60% to about 80%. As the skilled person will appreciate, vinyl content can be determined by infrared spectroscopy.

In one or more embodiments, the D of formula I includes at least 250, in other embodiments at least 350, in other embodiments at least 450, and in other embodiments at least 550 mer units deriving from the polymerization of conjugated diene monomer. In these or other embodiments, the D block of formula I includes at most 800, in other embodiments at most 750, in other embodiments at most 700, in other embodiments at most 650, and in other embodiments at most 600 mer units deriving from the polymerization of conjugated diene monomer.

In one or more embodiments, the $V^O$ and $V'$ blocks of formula I each independently include at least 25, in other embodiments at least 60, in other embodiments at least 75, in other embodiments at least 80, in other embodiments at least 90, in other embodiments at least 100, and in other embodiments at least 115 mer units deriving from the polymerization of vinyl aromatic monomer. In these or other embodiments, $V^O$ and $V'$ each independently include at most 200, in other embodiments at most 175, in other embodiments at most 160, in other embodiments at most 150, and in other embodiments at most 140 mer units deriving from the polymerization of vinyl aromatic monomer.

In one or more embodiments, the ratio of $V^O$ mer units to $V'$ mer units is at least 0.2:1, in other embodiments at least 0.4:1, in other embodiments at least 0.6:1, in other embodiments 0.8:1, in other embodiments at least 0.9:1, and in other embodiments at least 0.95:1. In these or other embodiments, the ratio of $V^O$ mer units to $V'$ mer units is less than 4:1, in other embodiments less than 3:1, in other embodiments less than 2:1, in other embodiments less than 1.5:1, in other embodiments less than 1.1:1, and in other embodiments less than 1.05:1. In one or more embodiments, the ratio of $V^O$ mer units to V' mer units is about 1:1.

In one or more embodiments, the blocks of the block copolymers defined by the formula I include less than 5%, in other embodiments less than 3%, in other embodiments less than 1%, and in other embodiments less than 0.5% tapering in any given block of the block copolymer. In these or other embodiments, the blocks of the block copolymers defined by the formula I are substantially devoid of tapering, which includes that amount of tapering or less that will not have an appreciable impact on the block copolymer. In one or more embodiments, the blocks of the block copolymers defined by the formula I are devoid of tapering.

In one or more embodiments, a of formula I is a diene block, and therefore the block copolymer can be defined by the formula II

$$d\text{-}V^O\text{-}D\text{-}V'\text{-}\omega \qquad \qquad II$$

where d is a polydiene block, and $V^O$, V', D, and ω are as defined above with respect to Formula I.

In one or more embodiments, d of formula II is characterized by a vinyl content (i.e., the percentage of mer units positioned in the 1,2-microstructure) of greater than 30%, in other embodiments greater than 40%, in other embodiments greater than 50%, in other embodiments greater than 55%, in other embodiments greater than 60%, in other embodiments greater than 65%, in other embodiments greater than 70%, in other embodiments greater than 75%, in other embodiments greater than 80%, and in other embodiments greater than 85%. In these or other embodiments, d of formula II is characterized by a vinyl content of at most 95%, in other embodiments at most 90%, in other embodiments at most 85%, and in other embodiments at most 80%. In one or more embodiments, d is characterized by a vinyl content of from about 30% to about 90%, in other embodiments from about 50% to about 85%, and in other embodiments from about 60% to about 80%.

In one or more embodiments, d of formula II includes at least 10, in other embodiments at least 40, in other embodiments at least 60, and in other embodiments at least 80, in other embodiments at least 100, and in other embodiments at least 120 mer units deriving from the polymerization of conjugated diene monomer. In these or other embodiments, d of formula II includes at most 500, in other embodiments at most 350, in other embodiments at most 250, in other embodiments at most 200, in other embodiments at most 180, in other embodiments at most 160, and in other embodiments at most 120 mer units deriving from the polymerization of conjugated diene monomer.

In one or more embodiments, the peak molecular weight (Mp) of the overall block copolymers may be at least 40 kg/mole, in other embodiments at least 50 kg/mole, in other embodiments at least 60 kg/mole, and in other embodiments at least 70 kg/mole. In these or other embodiments, the overall peak molecular weight of the block copolymers of the present invention may be at most 150 kg/mole, in other embodiments at most 125 kg/mole, in other embodiments at most 100 kg/mole, and in other embodiments at most 90 kg/mole.

In one or more embodiments, the overall vinyl content of the block copolymers of the present invention may be at least 50%, in other embodiments at least 55%, in other embodiments at least 60%, in other embodiments at least 65%, in other embodiments at least 70%, in other embodiments at least 75%, in other embodiments at least 80%, and in other embodiments at least 85%. In these or other embodiments, the overall vinyl content is at most 95%, in other embodiments at most 90%, in other embodiments at most 85%, and in other embodiments at most 80%. As those skilled in the art will appreciate, the overall vinyl content of the block copolymers can be tailored by adjusting the vinyl content of particular diene blocks. For example, where the block copolymers are defined by the formulae I and II, the vinyl content of the d block can be increased, without necessarily providing a corresponding increase to the D block, to affect an overall increase in the vinyl content of block copolymer.

In one or more embodiments, the polydiene blocks derive from conjugated diene monomer such as 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. In one or more embodiments, the polyvinyl aromatic blocks derive from the polymerization of vinyl aromatic monomer such as styrene, p-methylstyrene, alpha-methylstyrene, and vinylnaphthalene.

In one or more embodiments, the block copolymers employed in the present invention can be synthesized by employing anionic polymerization techniques. In one or more embodiments, living polymers include anionically polymerized polymers (i.e., polymers prepared by anionic polymerization techniques). Anionically-polymerized living polymers may be formed by reacting anionic initiators with certain unsaturated monomers to propagate a polymeric structure. Throughout formation and propagation of the polymer, the polymeric structure may be anionic or "living." A new batch of monomer subsequently added to the reaction can add to the living ends of the existing chains and increase the degree of polymerization. A living polymer, therefore, includes a polymeric segment having a living or reactive end. Anionic polymerization is further described in George Odian, *Principles of Polymerization*, ch. 5 ($3^{rd}$ Ed. 1991), or Panek, 94 J. Am. Chem. Soc., 8768 (1972), which are incorporated herein by reference.

In one or more embodiments, the block copolymers of the present invention can be prepared by sequential addition of the distinct monomer that give rise to the various blocks. For example, vinyl aromatic monomer can be charged and polymerized to form a living polyvinyl aromatic living polymer chain. After the vinyl aromatic monomer is consumed or substantially consumed, the conjugated diene monomer can be charged. The conjugated diene monomer adds to the living polyvinyl aromatic chain and forms a polydiene block tethered thereto. After the diene monomer is consumed or substantially consumed, additional monomer can be added to form another block tethered to the copolymer. For example, vinyl aromatic monomer can be charged to form another vinyl aromatic block. This process can be continued until the living polymer is quenched (e.g., protonated).

The process can be started by employing an anionic polymerization initiator, although as those skilled in the art appreciate, other means can be employed to initiate the polymerization. Exemplary anionic initiators include organolithium compounds. In one or more embodiments, organolithium compounds may include heteroatoms. In these or other embodiments, organolithium compounds may include one or more heterocyclic groups.

Types of organolithium compounds that may be used as initiators include, but are not limited to, alkyllithium, aryllithium compounds, and cycloalkyllithium compounds. Specific examples of organolithium compounds include ethyllithium, n-propyllithium, isopropyllithium, n-butyllithium, sec-butyllithium, t-butyllithium, n-amyllithium, isoamyllithium, and phenyllithium. Still other anionic initiators include organosodium compounds such as phenylsodium and 2,4,6-trimethylphenylsodium. Also contemplated are those anionic initiators that give rise to di-living polymers, wherein both ends of a polymer chain is living. Examples of such initiators include dilithio initiators such as those prepared by reacting 1,3-diisopropenylbenzene with sec-butyllithium. These and related difunctional initiators are disclosed in U.S. Pat. No. 3,652,516, which is incorporated herein by reference.

In particular embodiments, the organolithium compounds include a cyclic amine-containing compound such as lithiohexamethyleneimine. These and related useful initiators are disclosed in the U.S. Pat. Nos. 5,332,810, 5,329,005, 5,578,542, 5,393,721, 5,698,646, 5,491,230, 5,521,309, 5,496,940, 5,574,109, and 5,786,441, which are incorporated herein by reference. In other embodiments, the organolithium compounds include alkylthioacetals (e.g., dithianes) such as 2-lithio-2-methyl-1,3-dithiane. These and related useful initiators are disclosed in U.S. Pat. No. 7,153,919, and U.S. Publ. Nos. 2006/0264590, and 2006/0264589, which are incorporated herein by reference. In still other embodiments, the organolithium compounds include alkoxysilyl-containing initiators, such as lithiated t-butyldimethylpropoxysilane. These and related useful initiators are disclosed in U.S. Pat. No. 7,335,712, which is incorporated herein by reference. In one or more embodiments, the anionic initiator employed is trialkyltinlithium compound such as tri-n-butyltinlithium. These and related useful initiators are disclosed in U.S. Pat. Nos. 3,426,006 and 5,268,439, which are incorporated herein by reference.

The amount of initiator employed in conducting anionic polymerizations can vary widely based upon the desired polymer characteristics. In one or more embodiments, from about 0.1 to about 100, and in other embodiments from about 0.33 to about 10 mmol of lithium per 100 g of monomer is employed.

In one or more embodiments, synthesis of the block copolymers of the present invention is conduction in solution, which includes those polymerization mediums where the monomer to be polymerized is dissolved in a solvent. In these or other embodiments, the polymer that is synthesized is also soluble in the solvent. In one or more embodiments, the anionic polymerizations of the present invention may be conducted in a polar solvent such as tetrahydrofuran (THF) or dialkyl ethers such as dimethyl ether, or a non-polar hydrocarbon such as the various cyclic and acyclic hexanes, heptanes, octanes, pentanes, their alkylated derivatives, and mixtures thereof, as well as benzene. Mixtures of two or more of these solvents can also be used. As those skilled in the art appreciate, the solvent can be selected to optimize the solubility of the monomer that is polymerized or the polymer that is synthesized.

In order to achieve the desired vinyl content of the polydiene blocks, polymerization of the diene monomer can be conducted in the presence of a vinyl modifier while maintaining the polymerization medium below certain threshold temperatures.

In one or more embodiments, compounds useful as vinyl modifiers include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as vinyl modifiers include tetrahydrofuran (THF), linear and cyclic oligomeric oxolanyl alkanes such as 2,2-bis(2'-tetrahydrofuryl) propane, di-piperidylethane, dipiperidylmethane, hexamethylphosphoramide, N—N-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, which is incorporated herein by reference. Blends of two or more of the above vinyl modifiers may advantageously be employed to achieve the properties sought by the present invention. In particular embodiments, it has advantageously been discovered that bis-oxolanyl propane and oligomers thereof, including those disclosed in U.S. Pat. Nos. 4,429,091, 4,647,635, 5,241,008, and 5,331,035, which are incorporated herein by reference, are extremely beneficial for practicing the present invention and advantageously allow for production of the desired high-vinyl block copolymers under commercially feasible rates and conditions.

The amount of vinyl modifier employed in conducting anionic polymerizations can vary widely based upon the desired vinyl content. In one or more embodiments, the amount of vinyl modifier employed may be expressed in parts by weight modifier per 100 parts by weight monomer. In one or more embodiments, at least 0.025 parts by weight, in other embodiments at least 0.1 parts by weight, in other embodiments at least 0.2 parts by weight, in other embodiments at least 0.35 parts by weight, and in other embodiments at least 0.5 parts by weight vinyl modifier per 100 parts by weight monomer may be employed. In these or other embodiments, less than 10 parts by weight, in other embodiments less than 5 parts by weight, in other embodiments less than 2.5 parts by weight, in other embodiments less than 1.0 parts by weight, and in other embodiments less than 0.8 parts by weight vinyl modifier per 100 parts by weight monomer may be employed.

In other embodiments, the amount of vinyl modifier employed may be expressed based upon the number of moles of vinyl modifier per moles of lithium (or other metal) associated with the initiator. In one or more embodiments, at least 0.1 moles, in other embodiments at least 0.5 moles, in other embodiments at least 1.0 moles, in other embodiments at least 1.25 moles, and in other embodiments at least 1.5 moles of vinyl modifier per mole of lithium may be employed. In these or other embodiments, less than 20 moles, in other embodiments less than 10 moles, in other embodiments less than 5 moles, in other embodiments less than 2.5 moles, and in other embodiments less than 2.0 moles of vinyl modifier per mole of lithium may be employed.

In one or more embodiments, the polymerization of the polydiene blocks (i.e., D and d) is conducted by setting the initial batch temperature (i.e., the temperature of the polymerization medium at the beginning of the polymerization of diene monomer) at temperatures below 30° C., in other embodiments below 25° C., in other embodiments below 20° C., in other embodiments below 15° C., and in other embodiments below 12° C. In these or other embodiments, the initial batch temperature may be set at above −10° C., in other embodiments above 0° C., and in other embodiments above 5° C.

In one or more embodiments, the temperature of the polymerization medium during the polymerization of conjugated diene monomer (i.e., during the formation of the polydiene blocks D or d) is maintained so as to achieve a peak polymerization temperature below 60° C., in other embodiments below 55° C., in other embodiments below 50° C., in other embodiments below 48° C., in other embodiments below 46° C., in other embodiments below 40° C., in other embodiments below 35° C., and in other embodiments below 30° C. As those skilled in the art appreciate, the initial batch temperature, as well as the peak polymerization temperature, can be controlled by employing several techniques, as well as combinations thereof. For example, the jacket temperature can be adjusted, reflux condensers can be employed, particular solvents can be selected, and the solids concentration of the polymerization can be adjusted. For example, in one or more embodiments of the present invention, polymerization of the D block or blocks of the block copolymers of one or more embodiments of the present invention (e.g. the polydiene blocks) can be allowed to achieve a peak polymerization temperature of at least 18° C., in other embodiments least 20° C., in other embodiments at least 23° C., in other embodiments at least 25° C., in other embodiments at least 27° C., and in other embodiments at least 30° C. In one or more embodiments, the peak polymerization temperature achieved during polymerization of the d block is at least at least 5° C., in other embodiments least 8° C., in other embodiments at least 10° C., in other embodiments at least 12° C., in other embodiments at least 15° C., and in other embodiments at least 18° C. In these or other embodiments, the peak polymerization temperature achieved during polymerization of the d block is less than 35° C., in other embodiments less than 30° C., in other embodiments less than 27° C., in other embodiments less than 25° C., and in other embodiments less than 22° C.

Other Ingredients

Other ingredients that are typically employed in rubber compounding may also be added to the rubber compositions. These include oils, plasticizers, waxes, scorch inhibiting agents, processing aids, zinc oxide, tackifying resins, fatty acids such as stearic acid, and peptizers. In particular embodiments, the oils that are employed include those conventionally used as extender oils, which are described above. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Ingredient Amounts

In one or more embodiments, the vulcanizable compositions include at least 20, in other embodiments at least 30, and in other embodiments at least 40 percent by weight of a rubber component, based upon the entire weight of the composition, where the rubber component includes one or more elastomers exclusive of the vinyl aromatic-containing block copolymer. In these or other embodiments, the vulcanizable compositions include at most 90, in other embodiments at most 70, and in other embodiments at most 60 percent by weight of the rubber component based on the entire weight of the composition. In one or more embodiments, the vulcanizable compositions include from about 20 to about 90, in other embodiments from about 30 to about 70, and in other embodiments from about 40 to about 60 percent by weight of a rubber component based upon the entire weight of the composition.

In certain embodiments of the invention, the rubber component includes (and in certain embodiments consists of) (i) natural rubber, (ii) optionally a synthetic diene rubber (e.g., polybutadiene), and (iii) the block copolymer of this invention. In one or more of these embodiments, the weight ratio of natural rubber to synthetic diene rubber may be from 0.4:1 to 1.5:1, in other embodiments from 0.6:1 to 1.3:1, and in other embodiments from 0.8:1 to 1.2:1.

In one or more embodiments, the rubber component of the vulcanizable compositions include at least 5, in other embodiments at least 10, in other embodiments at least 15, in other embodiments at least 20, in other embodiments at least 25, in other embodiments at least 30, in other embodiments at least 35, and in other embodiments at least 40 percent by weight vinyl aromatic-containing block copolymer (e.g., SBS) based on the entire weight of the rubber component. In these or other embodiments, the vulcanizable composition includes at most 70, in other embodiments at most 65, in other embodiments at most 60, in other embodiments at most 50, in other embodiments at most 45, and in other embodiments at most 40 percent by weight of vinyl aromatic-containing block copolymer based on the entire weight of the rubber component. In one or more embodiments, the vulcanizable composition includes from about 10 to about 100, in other embodiments from about 20 to about 90, and in other embodiments from about 30 to about 80 percent by weight vinyl aromatic-containing block copolymer based on the entire weight of the rubber component.

In one or more embodiments, the vulcanizable compositions include at least 5 pbw, in other embodiments at least 25 pbw, in other embodiments at least 45 pbw, in other embodiments at least 55 pbw, in other embodiments at least 65 pbw, in other embodiments at least 75 pbw, and in other embodiments at least 85 parts by weight (pbw) filler (e.g., carbon black) per 100 parts by weight rubber (phr). In these or other embodiments, the vulcanizable composition includes at most 200 pbw, in other embodiments at most 150 pbw, and in other embodiments at most 120 pbw of the filler phr. In one or more embodiments, the vulcanizable composition includes from about 5 pbw to about 200 pbw, in other embodiments from about 65 pbw to about 150 pbw, and in other embodiments from about 75 pbw to about 120 pbw of filler phr.

In one or more embodiments, the vulcanizable compositions include at least 5 pbw, in other embodiments at least 7 pbw, in other embodiments at least 10 parts by weight (pbw) reinforcing resin per 100 parts by weight rubber (phr). In these or other embodiments, the vulcanizable composition includes at most 25, in other embodiments at most 20, and in other embodiments at most 15 pbw reinforcing resin phr. In one or more embodiments, the vulcanizable composition includes from about 5 to about 25, in other embodiments from about 7 to about 20, and in other embodiments from about 10 to about 15 pbw reinforcing resin phr.

The skilled person will be able to readily select the amount of vulcanizing agents to achieve the level of desired cure. Also, the skilled person will be able to readily select the amount of cure accelerators to achieve the level of desired cure. In particular embodiments, the bead filler vulcanizable compositions of the invention include sulfur or sulfur-based curatives. In one or more of these embodiments, the vulcanizable compositions include greater than 5 pbw, in other embodiments greater than 7 pbw, and in other embodiments greater than 9 pbw sulfur or equivalent curative phr.

Mixing Procedure

All ingredients of the rubber compositions can be mixed with standard mixing equipment such as Banbury or Brabender mixers, extruders, kneaders, and two-rolled mills. As suggested above, the ingredients are mixed in two or more stages. In the first stage (i.e., mixing stage), which typically includes the rubber component and filler, is prepared. To prevent premature vulcanization (also known as scorch), vulcanizing agents. Once the masterbatch is prepared, the vulcanizing agents may be introduced and mixed into the masterbatch in a final mixing stage, which is typically conducted at relatively low temperatures so as to reduce the chances of premature vulcanization. Additional mixing stages, sometimes called remills, can be employed between the masterbatch mixing stage and the final mixing stage.

Preparation of Tire

The compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as the styrene-containing block copolymer, as well as the fillers and processing aids, may be evenly dispersed throughout the crosslinked network. In particular embodiments, one or more of the compound ingredients may become crosslinked or otherwise chemically bonded to the crosslinked rubber network. As the skilled person will appreciate, the amounts of the various ingredients, especially those that do not react, will remain within the cured tire component the same as they existed within the compound.

Pneumatic tires can be made as discussed in U.S. Pat. Nos. 5,866,171, 5,876,527, 5,931,211, and 5,971,046, which are incorporated herein by reference. For example, the various tire components can be prepared as green tire components (i.e., uncured tire components), and assembled into a green tire. The green tire can then be subjected to curing conditions to form a vulcanized tire wherein the various green components are generally adhered to one another through the vulcanization process.

Characteristics of Bead Filler

In one or more embodiments, the cured bead fillers of the present invention are characterized by an advantageous balance of properties. In particular embodiments, the bead fillers are characterized by an E', measured at 25° C. and 1% strain, of greater than 60, in other embodiments greater than 80, in other embodiments greater than 100, in other embodiments greater than 120, in other embodiments greater than 130, in other embodiments greater than 140, in other embodiments greater than 150, in other embodiments greater than 160, in other embodiments greater than 170 MPa. As the skilled person will recognize, E' can be measured by using a dynamic analyzer such as a GABO Explexor 500N Hysteresis Analyzer.

In one or more embodiments, the vulcanizable compositions used to prepare the bead fillers of the present invention are characterized by advantageous rheological properties. For example, the vulcanizable compositions are characterized by a Max Torque ($M_H$) of greater than 20, in other embodiments greater than 30, in other embodiments greater than 45, and in other embodiments greater than 60 dNm. As the skilled person will recognize, Max Torque can be measured by using a rheometer such as an Alpha MDR 2000 rheometer.

What is claimed is:

1. A tire comprising:
a bead filler including the vulcanized residue of a vulcanizable composition including a rubber and a vinyl aromatic-containing block copolymer compound, where the vinyl aromatic-containing copolymer is defined by the formula II $$d\text{-V}\omicron\text{-D-V'-}\omega \qquad \qquad \text{II}$$

where each V is independently a polyvinyl aromatic block, D is a polydiene block, ω is a hydrogen atom, a functional group, or a polymeric segment or block, and where d is a polydiene block, and where the overall vinyl content of the block copolymer is greater than 80%.

2. The tire of claim 1, where the bead filler further comprises at least 5 parts by weight of the residue of a reinforcing resin per 100 parts by weight rubber.

3. The tire of claim 1, where the bead filler further comprises at least 10 parts by weight of the residue of a reinforcing resin per 100 parts by weight rubber.

4. The tire of claim 2, where the bead filler further comprises at least 55 parts by weight carbon black per 100 parts by weight rubber.

5. The tire of claim 3, where the bead filler further comprises at least 65 parts by weight carbon black per 100 parts by weight rubber.

6. The tire of claim 1, where the bead filler is characterized by an E' of greater than 120 MPa at 25° C. and 1% strain.

7. The tire of claim 1, where the bead filler is characterized by an E' of greater than 140 MPa at 25° C. and 1% strain.

8. A method for preparing a tire, the method comprising:
vulcanizing a green tire, where said green tire includes a green bead filler that is fabricated from a vulcanizable composition of matter comprising a rubber, a vinyl aromatic-containing block copolymer compound, and a curative, where the vinyl aromatic-containing copolymer is defined by the formula II $$d\text{-V}\omicron\text{-D-V'-}\omega \qquad \qquad \text{II}$$

where each V is independently a polyvinyl aromatic block, D is a polydiene block, ω is a hydrogen atom, a functional group, or a polymeric segment or block, and where d is a polydiene block, and where the overall vinyl content of the block copolymer is greater than 80%.

9. The tire of claim 1, where the bead filler comprises from about 5 to about 25 parts by weight, per 100 parts by weight rubber, of the reaction product of a donor compound and an acceptor compound.

10. The tire of claim 1, where the bead filler comprises from about 7 to about 20 parts by weight, per 100 parts by weight rubber, of the reaction product of a donor compound and an acceptor compound.

11. The tire of claim 1, where the vulcanizable composition includes at least 10 parts by weight and at most 90 parts by weight of the vinyl aromatic-containing block copolymer, at least 7 parts by weight of a reinforcing resin, at least 65 parts by weight of a carbon black, per 100 parts by weight rubber.

12. The method of claim 8, where the vulcanizable composition includes at least 10 parts by weight and at most 90 parts by weight of the vinyl aromatic-containing block copolymer, at least 7 parts by weight of a reinforcing resin, at least 65 parts by weight of a carbon black, per 100 parts by weight rubber.

* * * * *